Sept. 13, 1927.
J. A. SUSONG
HOT WATER HEATER
Filed Aug. 24, 1926
1,641,997
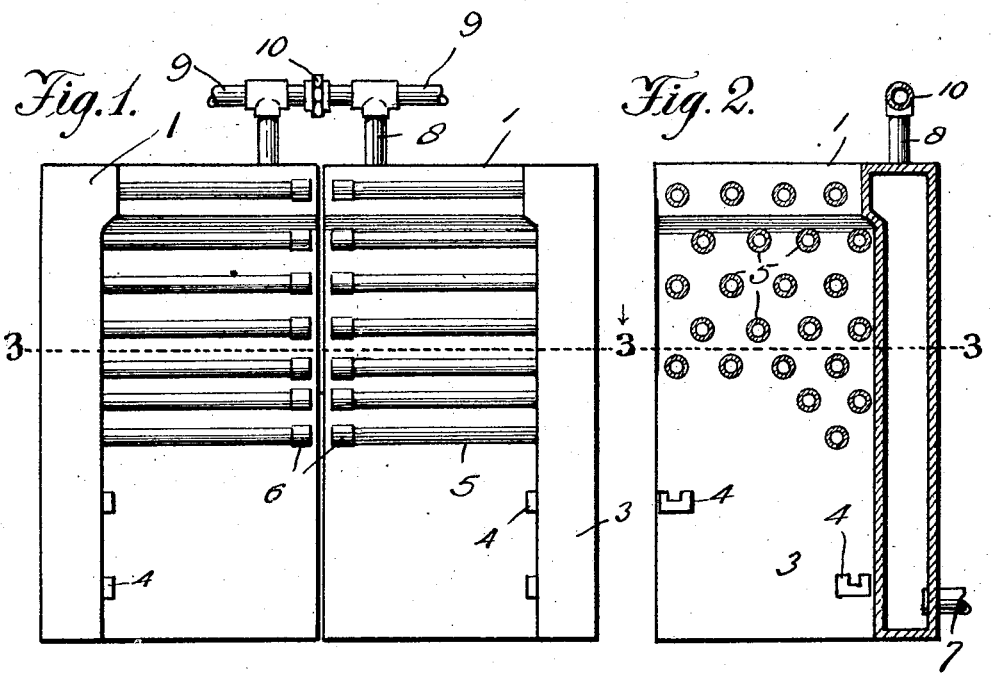
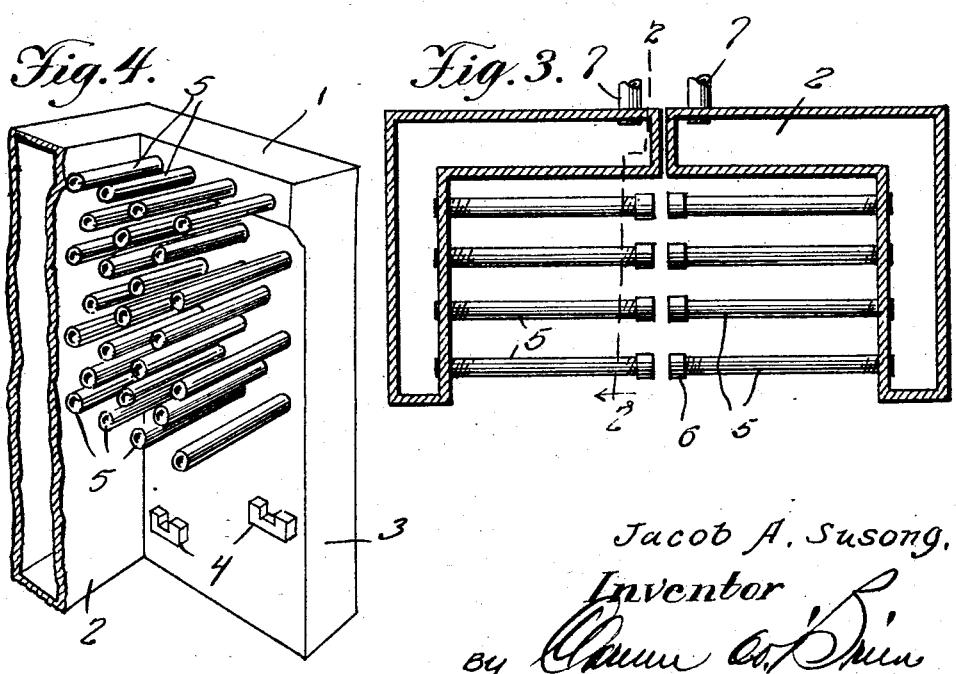
Jacob A. Susong,
Inventor Patented Sept. 13, 1927.

1,641,997

UNITED STATES PATENT OFFICE.

JACOB ANDREW SUSONG, OF NEWPORT, TENNESSEE.

HOT-WATER HEATER.

Application filed August 24, 1926. Serial No. 131,270.

My present invention has to do with hot water heating systems; and it contemplates the provision of a combined open fire place and water containing means whereby the heat given off by a grate fire may be utilized to raise the temperature of water in a circulating system, and in that way heat portions of a building remote from the grate fire.

My invention also contemplates the utilization of certain elements of the water containing means to form the back wall and the side wall of a fire place and to maintain in working position the grate on which fuel is superposed for maintenance of an open grate fire.

To the attainment of the foregoing, the invention consists in the improvement as hereinafter described and definitely claimed.

In the accompanying drawings forming a part of the specification:

Figure 1 is a front elevation illustrating the best practical embodiment of my invention of which I am cognizant.

Figure 2 is a vertical section taken in the plane indicated by the line 2—2 of Figure 3, looking toward the left.

Figure 3 is a horizontal section taken in the plane indicated by the line 3—3 extending through Figures 1 and 2.

Figure 4 is a sectional perspective showing a portion of one of the hollow wall members and the gang of tubes carried thereby.

Similar numerals of reference designate corresponding parts in all the views of the drawing.

Among other elements, my improvement comprises hollow wall members 1. Each of the said hollow wall members 1 is of right angular form in horizontal section and each comprises a back wall portion 2, and a side wall portion 3. The back wall portions 2 are arranged end to end and with the ends in close proximity to form the back of a fire place, and each of the portions 3 reaches forwardly from the outer end of its respective portion 1 so that the portions 3 will form the side walls of an open fire place. Each of the said portions 3 is provided upon its inner side with integral lugs 4 designed to carry a grate (not shown), which grate positioned in the fire place formed by the hollow wall members 1 will be utilized to support the fuel necessary for the maintenance of an open grate fire in the fire place formed, as stated, by the hollow wall members 1.

It will be gathered from the foregoing that the scheme of my invention has for its chief feature the utilization of the heat given off by the fire on the grate alluded to, to heat water in the hollow wall members 1, and in order to utilize the said heat to greater advantage and particularly the heat given off by products of combustion to an uptake, I provide the portions 3 of the hollow wall members 1 with gangs of inwardly reaching and closely arranged tubes 5, the said tubes 5 being capped at their inner ends as designated by 6, while their outer ends are in full and free communication with the interiors of the hollow wall portions 3. It will also be noted from Figures 2 and 4 that the batteries or gangs of tubes 5 are arranged above and in the same vertical plane as the grate to be carried by the lugs 4, and that consequently the tubes 5 as well as water therein will be heated directly by the bed of fire on the grate as well as by heated products of combustion on their way to a chimney or uptake.

Connected to the lower portions of the inner or confronting ends of the portions 2 of the members 1, are the return pipes 7 of a hot water heating system, it being understood in this connection that the said pipes 7 are made to return water in conventional manner from a conventional or any other appropriate hot water radiator located at a point remote from the fire place in which the members 1 are disposed. Pipes 8 are extended upwardly from the inner adjacent portions of the two members 1, the said pipes 8 being in full and free communication with the interior of the member portions 2 and being connected to pipes 9 and being also connected together, by preference, through the medium of an interposed pipe 10. The pipes 9 are designed to conduct heated water in conventional manner to a conventional or any other appropriate hot water radiator or radiator located at a point or points remote from the fire place in which the members 1 are arranged.

It will be gathered from the foregoing that when my improvment is in use, the water heated in the members 1 and in the tubes 5 by the open grate fire will circulate through the pipes 9 to radiators, and the heat will be radiated from such radiators or from the heated water therein, after which the water will return through the pipes 7 to the lower portions of the members 1 to be again heated.

Manifestly, in accordance with prevailing practice a valved pipe (not shown) may lead from a house supply pipe to any one of the pipes 7, 8 or 9, for the supply of water to the circulating system whenever the evaporation of water in said system makes the replenishing of the supply of water in the system necessary.

It will be appreciated from the foregoing that by virtue of my invention, the heat given off by an open grate fire is used directly to heat an apartment in which the open grate fire is located, and is also utilized to heat a portion of the apartment or another apartment remote from the location of the open grate fire; and it will also be appreciated that my improvement is simple and inexpensive in construction and is susceptible of ready installation.

I have explicitly described the construction and relative arrangement of the parts embraced in the present and preferred embodiment of my invention in order to impart an exact understanding of the said embodiment in all of its details.

I do not desire, however, to be understood as limiting myself to the construction shown and specifically described, my invention being defined by my appended claims within the scope of which structural changes may be made without departure from my invention.

Having thus described the invention, what I claim as new and desire to secure by Letters Patent is:—

1. A device for heating water for building heating purposes, comprising hollow wall members of right angular form in plan having back and side portions adapted to be arranged in a fire place with the end of their back portions in confronting relation and also having means for supporting a grate between the side portions and in front of the back portions, means in communication with the interior of said members for holding water above a fire in the grate so supported and conduit means for connecting the said members with means for radiating heat from hot water.

2. A device for heating water for building heating purposes, comprising hollow wall members of right angular form in plan having back and side portions adapted to be arranged in a fire place with the ends of their back portions in confronting relation and also having means at the inner sides of their side portions supporting a grate, and conduit means for connecting the said members together and with means for radiating heat from hot water; the side portions of the said hollow wall members being equipped with inwardly extending tubes in communication with the interiors of said portions and closed at their inner ends.

3. A device for heating water for building heating purposes, comprising hollow wall members of right angular form in plan having back and side portions adapted to be arranged in a fire place with the ends of their back portions in confronting relation, and conduit means for connecting the said members with means for radiating heat from hot water; the side portions of the hollow members being equipped at their inner sides with integral grate supporting lugs, and being also equipped above said lugs with gangs or batteries of closely arranged tubes, communicating with the interior of the side portions of the hollow members and closed at their inner ends, and the closed ends of the tubes of the two gangs or batteries being spaced apart and arranged in confronting relation.

In testimony whereof I affix my signature.

JACOB ANDREW SUSONG.